United States Patent Office 2,888,962
Patented June 2, 1959

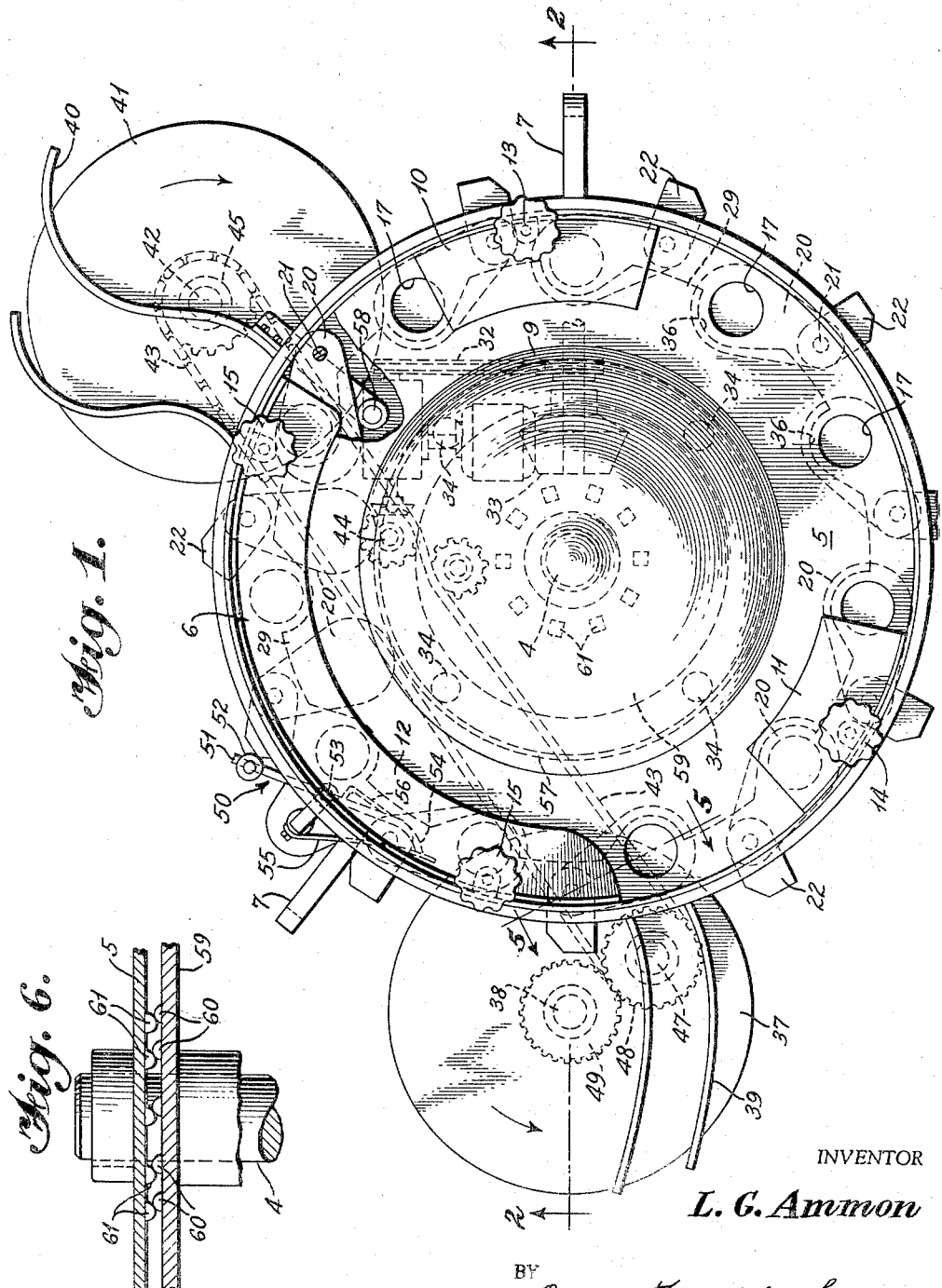

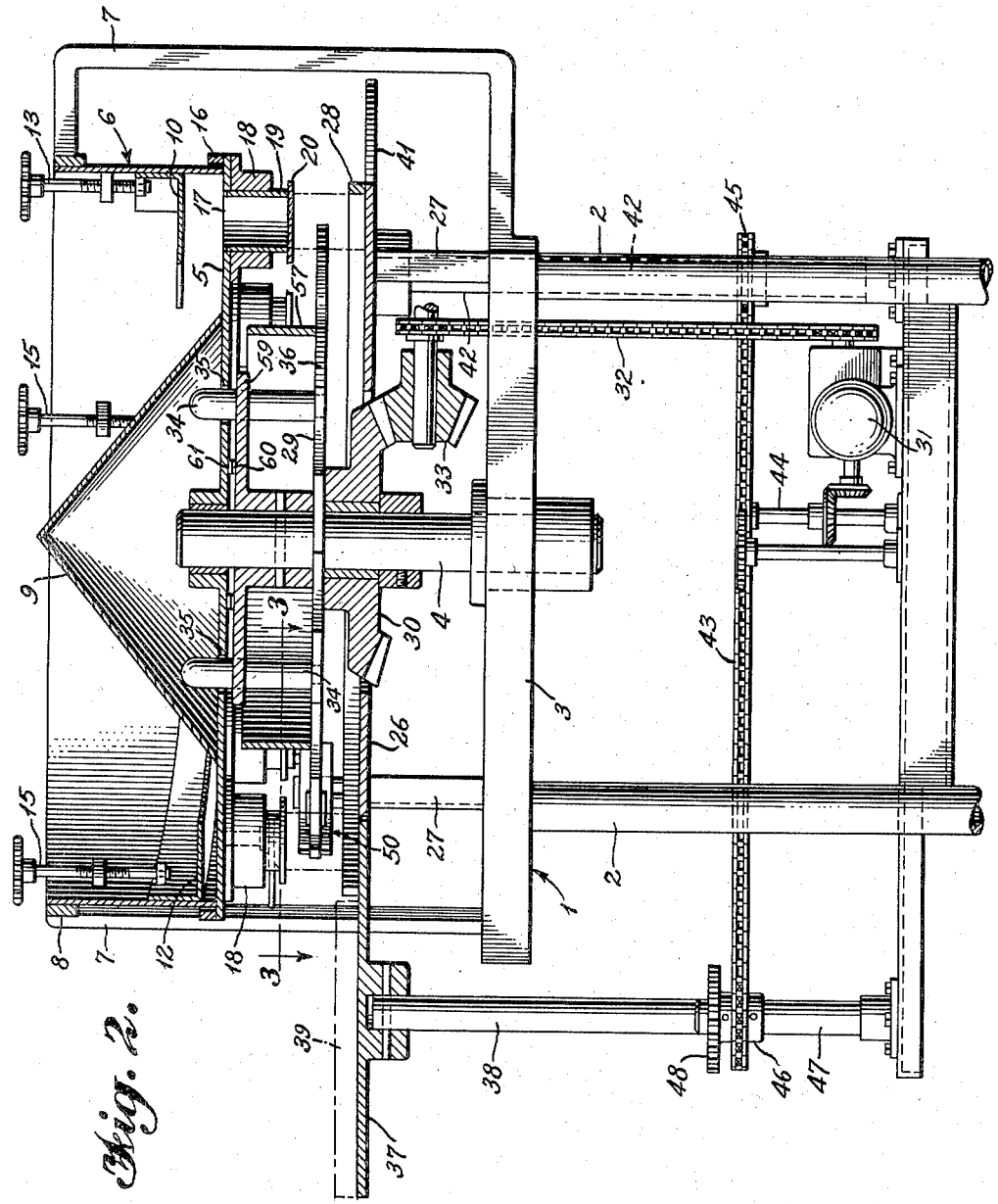

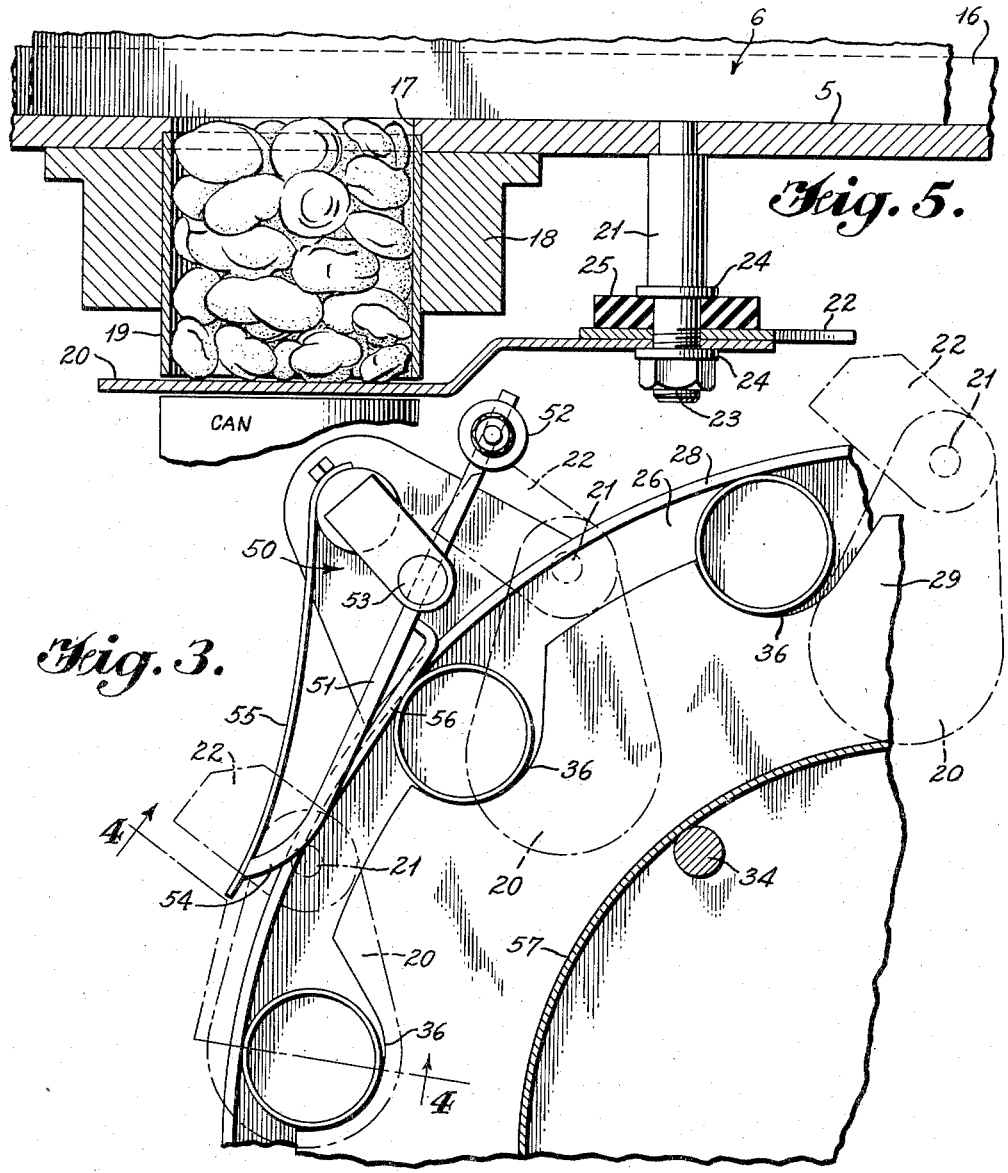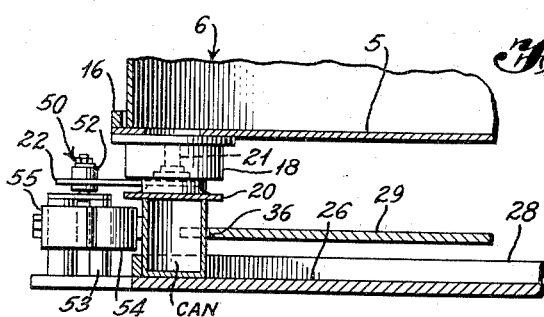

2,888,962

CAN-FILLING MACHINES

Lewis Garfield Ammon, Gap, Pa., assignor to
Arece L. Anderson

Application January 23, 1957, Serial No. 635,871

5 Claims.  (Cl. 141—143)

This invention relates to canning machinery, and in particular to machinery for measuring and loading into cans a product such as a vegetable, fruit or the like. The invention is specially concerned with the canning of the mushrooms, but the machine is not limited to such use.

In the canning of some food products, and particularly mushrooms, it is vitally important that precisely the proper quantity of the product be put in each can. Food regulations require that the amount stated upon the label be in the can and to put in an oversupply represents a loss to the canner. This loss is particularly great with a product such as mushrooms, where the product is expensive and, due to the small quantity packed in individual cans, the amount included over the required amount represents a large percentage of the total pack. This can represent the difference between profit and loss.

Not only has it been difficult to pack to the precise amount with products such as mushrooms, but due to the clinging quality of the product, particularly when wet, it has been difficult to get the product to fall into the can.

The object of the present invention is to provide a machine which will measure precise quantities of the product to be packed and deposit them in cans fed through the machine.

Another object of the invention is to provide such a machine which has means to ensure the deposit of the produce in the cans.

Still another object is the provision of means in a machine of this character to prevent the deposit of produce after measuring if no can is positioned to receive it.

Other objects of the invention will become apparent from the following description of one practical embodiment thereof when taken in conjunction with the drawings which accompany, and form part of, this specification.

In the drawings:

Figure 1 is a top plan view of a machine for packing produce embodying the principles of the present invention;

Figure 2 is a vertical section through the machine taken on the line 2—2 of Figure 1;

Figure 3 is a partial horizontal section taken on the line 3—3 of Figure 2, illustrating the can star with the gate opening;

Figure 4 is a vertical section taken on the line 4—4 of Figure 3;

Figure 5 is a vertical section through one of the filling pockets and its closing gate; and, Figure 6 is a fragmentary view showing the means for jolting the produce holding means to ensure deposit into the can.

In general, the machine consists in a rotating member having a plurality of produce receiving members to measure predetermind quantities of produce and deposit them in cans moving below, and in synchronism with the rotating member. Means are provided to prevent the deposit of produce if no can is present and to jolt the produce-receiving members to ensure deposit of the produce when a can is present.

Referring to the drawings in detail, there is shown a produce canning machine which is mounted upon a base frame 1. The frame is a table-like affair, having the legs 2 and top frame 3. A shaft 4 is fixed centrally of the top frame to stand vertically.

Rotatably mounted upon the top of the shaft 4 is a disk 5 which forms the bottom of a filler hopper 6. The hopper wall is made of a ring of sheet metal held in fixed position by struts 7 which are attached to the frame. A stiffening ring 8 may surround the top of the hopper wall. Produce dumped into the hopper will be directed toward the wall by a central cone deflector 9 mounted upon the disk 5. A platen 10 and baffles 11 and 12 are within the hopper, adjustably mounted by means of the screws 13, 14 and 15.

Disk 5 has an upstanding peripheral flange 16, surrounding the bottom of the hopper to close the gap between the wall and the disk and to maintain the proper concentric relationship between the two. The disk is also provided with a plurality of openings 17, arranged in a circle near the outer edge of the disk. The openings are of the same size and spaced apart equal distances around the disk. Below each opening, a collar 18 is fixed to the disk concentric to the opening. The collars receive and support short lengths of tubing which form filler pockets 19. The filler pockets will be the same diameter and length as the bodies of the cans to be filled. They are to receive can loads of produce to be packed for later deposit in the cans.

The bottom of each filler pocket is closed by means of a gate 20. The gates are sheet metal members pivotally mounted on studs 21 fixed to the underside of disk 5 for swinging movement to and from pocket-closing position. Each gate has an opening arm 22 which is cam operated, as will be described, for controlling the movement of the gate. The gates are shown as held upon the studs by nuts 23 with suitable washers 24. A rubber, or other resilient material, washer 25 may be used for contact with the gate to provide the friction necessary to hold the gate in its various operating positions.

The cans which are to be filled are supported upon an annular plate 26 which is supported by brackets 27 connected to the frame 3. This plate, of course, will be stationary. The plate may, or may not, extend all the way around the machine. It is only necessary that it be beneath the disk from the point of can delivery to can discharge. The plate will carry a can guide rail 28 which will hold cans to the required arcuate travel path beneath the filler pockets 19.

Cans are caused to move over the plate 26 by means of a star wheel 29. The star wheel is rotated by means of a bevel gear 30, fixed to the bottom of the star wheel and driven from a motor and gear reducer 31 through a chain and sprocket drive 32 and bevel gear 33. Star wheel 29, in turn, drives the disk 5 by means of a circular row of pins 34 fixed to the star wheel and slidable vertically through openings 35 in the disk. Star wheel 29 and disk 5, therefore, will rotate together.

The star wheel is notched, as at 36, to receive cans. The notches are sufficiently deep so that when a can is seated in a notch it will be closely adjacent the guard rail 28 so that the can will be closely confined to follow the arcuate path of the filler pocket 19 above it on the disk 5. The can-receiving notches are equal in number to the filler pockets in the disk and positioned directly below them. Thus, a can in a notch of the star wheel will be in vertical axial alignment with a filler pocket.

Cans are fed onto the plate 26 by a loading disk 37 mounted upon a shaft 38 supported from the frame 1. Rotation of the disk in a counterclockwise direction, as viewed in Figure 1, will cause cans to be brought into position to be picked up by the rotating star wheel and moved along the guard rail. A guide 39 may be mounted over the disk to direct the cans into the star wheel.

Filled cans are removed by means of guide rail 40, fixed to the plate 26, and positioned above it to act as a cam to move cans out of the star wheel notches, across plate 26, and onto a discharge disk 41. A second rail, which may be a continuation of guard rail 28, controls the movement of the cans across the disk 41. Disk 41 is supported upon a shaft 42 mounted on the frame 1. It will be obvious that cans may be brought to disk 37 and transported from disk 41 by any appropriate means.

The feed and discharge disks are driven in opposite directions. This may be accomplished by a chain drive 43 which passes around a sprocket on a drive shaft 44 which may be powered from the gear reducer. The chain passes around a sprocket 45 on the discharge disk shaft and a sprocket 46 on a shaft 47 adjacent shaft 38 of the feed disk. Shaft 47 also carries a gear 48 in mesh with a gear 49 on shaft 38. This will provide the reverse movement for the two disks.

It will be understood that the filler pockets will be loaded and the gates in closed position beneath them when the pockets approach the position where cans enter the machine. As the pockets approach this position, they pass beneath the baffle 12 which serves to close the tops of the pockets. When the gates are closed, the operating arms 22 are substantially radial to the disk and project beyond its perimeter. In order to open the gate of each pocket having a can beneath it, a combination can detecting and gate opening mechanism 50 is provided. This includes a spring-biased, pivoted lever 51 having a gate-opening roller 52 at one end. The lever is pivoted intermediate its ends at 53 to an extension of the can plate 26. The leading end of the lever (from the standpoint of can movement) is curved to provide a cam surface 54 to engage cans in the star wheel. The leading end of the lever is biased toward the can path by leaf spring 55 fixed to the can plate. This will position the leading end of the path of cans in the machine. When no can is present in a notch moving by the lever, the lever will remain in its innermost position with the roller 52 outside the outer end of the gate operating arm. Thus, the arm will not contact the lever and the gate will remain closed. When a can is in the notch, it will strike the end of the lever and ride along the cam surface 56, tilting the lever in a clockwise direction as viewed in Figure 3, and placing roller 52 in the path of the gate controlling arm. The arm will strike the roller, which will act as a cam, and rock the gate about its pivot 21 to uncover the bottom of the filler pocket. A circular shield 57 is placed upon the star wheel 29 about the pins 34 to prevent the gates from moving so far as to contact the pins and to hold the gate in proper position to contact the gate closer 53 when the gate reaches the can discharge point. The gate closer will be in the form of a pin secured to the can plate 26 and positioned in the path of movement of open gates. The gates will strike the pin and be closed at the discharge station.

During the time that the cans are in the star wheel and the gates are open, the contents of the filler pockets may be deposited in the cans. As mentioned above, the product being handled frequently clings to whatever it touches. Because of this the measured load in the filler pockets will not always drop out when the gate is opened unless some means is provided to force it out. To do this means are provided to jar the disk 5 periodically during its revolutions so as to shake the load loose from the filler pockets. To do this, plate 59 is fixed to the stationary shaft 4 intermediate the star wheel and the disk. Its top surface is spaced slightly below the disk, and carries a plurality of protuberances 60 arranged in a circular group concentric to the shaft 4. The protuberances are substantially semi-spherical in shape. The underside of disk 5 is provided with a similar circular group of protuberances 61. As the disk rotates the protuberances of the disk will contact and ride over the protuberances on the plate 59, thus, lifting the disk and letting it drop with a jar. As the can path from gate-opening to can-discharging positions is sufficiently long to subtend an angle including several hobs, the pockets will be jarred several times to ensure dropping of the contents into the can.

In operating the machine mushrooms are put in the hopper and the disk rotated. The central cone will cause the mushrooms to flow to the sides of the hopper over the pockets. Platen 10 serves to control the depth of mushrooms over the pockets. The platen together with the baffles 11 and 12 help to push mushrooms into the can so that a full measured pack is obtained. As the disk rotates, cans are moved into the star wheel, the gates opened, the load dropped into the cans, the cans removed and the gates closed to complete the circle. During all of this time, the jarring, or jolting, of the disk is continued to ensure the dropping of each can load.

It has been found that packing mushrooms with this machine has resulted in an extremely uniform pack. The usual two ounce cans are found upon weighing to vary but fractionally from the prescribed weight. There is no failure of the load dropping as the jarring invariably causes it to drop.

While in the above one practical embodiment of the invention has been disclosed, it will be understood that the details of structure shown and described are merely by way of illustration and that the invention may take other forms within the scope of the appended claims.

What is claimed is:

1. In a can-filling machine, a stationary hopper to receive produce to be canned, a rotatable disk forming a bottom for the hopper, the disk having a plurality of openings therein arranged in a circle concentric to the disk, an open-ended filler pocket in each of the openings to receive a can-filling charge of produce from the hopper, a gate pivotally mounted beneath the disk adjacent each filler pocket and movable to open and close the bottoms of the filler pockets, means to move cans through the machine below and in axial alignment with the filler pockets, can-controlled means to open the gates to uncover the bottoms of the filler pockets when cans are in place beneath the pockets, means to close the gates, and means to raise the disk vertically and permit it to drop at least once during the period each of the gates is open, whereby the charges in the filler pockets will be jarred loose from the pockets and drop into the cans.

2. In a can-filling machine as claimed in claim 1, said means to raise the disk comprising, a plurality of protuberances on the bottom of the disk arranged in a circle concentric to the disk, a stationary plate mounted below said disk upon which the protuberances of the disk may rest, and a similar circular group of protuberances on the upper surface of the stationary plate.

3. In a can-filling machine, a stationary hopper to receive produce to be canned, a rotatable disk forming a bottom for the hopper, said disk having a plurality of openings therein near the outer edge of the disk and arranged in a circle concentric to said disk, an open-ended filler pocket in each of the openings of a size to receive a can-filling charge, a gate pivotally mounted on the disk adjacent each filler pocket and movable to open and close the bottoms of the filler pockets, means to move cans through the machine below and in axial alignment with the filler pockets, means to move said gates to uncover the bottoms of said filler pockets to permit can-filling charges to drop from the filler pockets into the cans when cans are in place beneath the pockets, means to close said gates after the can-filling charge has been dropped, and means carried by the hopper to overlie and close the open tops of the filler pockets during the arc of movement of the disk from gate-opening to gate-closing positions to prevent entry of produce from the hopper while the gates are open.

4. In a can-filling machine as claimed in claim 3, said means to overlie and close the top of the filler pockets having one end raised above the disk and declining toward the disk in the direction of disk rotation.

5. In a can-filling machine, a stationary hopper to receive produce to be canned, a rotatable disk forming a bottom for the hopper, said disk having a plurality of openings therein near the outer edge of the disk and arranged in a circle concentric to said disk, an open-ended filler pocket in each of the openings of a size to receive a can-filling charge, a gate pivotally mounted on the disk adjacent each filler pocket and movable to open and close the bottoms of the filler pockets, means to move cans through the machine below and in axial alignment with the filler pockets, means to move said gates to uncover the bottoms of said filler pockets to permit can-filling charges to drop from the filler pockets into the cans when cans are in place beneath the pockets, said means to move cans through the machine comprising a horizontal can-supporting plate beneath the path of travel of the filler pockets, a star wheel between said plate and said disk concentric to the disk and having a pocketed can-embracing periphery overlying a portion of the can-supporting plate, and said means to move the gates comprising a lever having a gate-opening cam thereon, said lever being pivoted to permit swinging movement of the gate-opening cam in a horizontal plane toward and from the star wheel, means to bias the cam away from the star wheel, a portion of said lever located in the path of movement of cans through said machine whereby the lever may be moved to position said cam to be struck by and open the gates as the disk is rotated.

References Cited in the file of this patent

UNITED STATES PATENTS

| | | |
|---|---|---|
| 1,534,035 | Steere | Apr. 21, 1925 |
| 2,105,621 | Testi | Jan. 18, 1938 |
| 2,141,618 | Roge | Dec. 27, 1938 |
| 2,710,127 | Fechheimer | June 7, 1955 |